US006136945A

United States Patent [19]
Mestanza

[11] Patent Number: 6,136,945
[45] Date of Patent: Oct. 24, 2000

[54] METHOD FOR QUENCHING OF POLYCARBONATE AND COMPOSITIONS PREPARED THEREBY

[75] Inventor: Raphael Mestanza, Saint Riquier es Plains, France

[73] Assignee: General Electric Company, Schenectady, N.Y.

[21] Appl. No.: 09/313,063

[22] Filed: May 17, 1999

[51] Int. Cl.[7] ..................... C08G 64/00
[52] U.S. Cl. ..................... 528/196; 528/198
[58] Field of Search ..................... 528/196, 198

[56] References Cited

U.S. PATENT DOCUMENTS

| | | | |
|---|---|---|---|
| 5,210,268 | 5/1993 | Fukuoka et al. | 558/270 |
| 5,319,066 | 6/1994 | King, Jr. | 528/199 |
| 5,403,878 | 4/1995 | Ishiwa et al. | 524/158 |
| 5,418,269 | 5/1995 | Ishiwa et al. | 524/315 |
| 5,470,938 | 11/1995 | Sakashita et al. | 528/198 |
| 5,606,007 | 2/1997 | Sakashita et al. | 528/176 |
| 5,713,453 | 2/1998 | Schornhorst et al. | 198/380 |
| 5,717,057 | 2/1998 | Sakashita et al. | 528/199 |
| 5,834,615 | 11/1998 | Nishihira et al. | 558/274 |

FOREIGN PATENT DOCUMENTS

EP 709 421 A1 10/1995 European Pat. Off. .

*Primary Examiner*—Terressa M. Boykin

[57] ABSTRACT

Polycarbonate produced by melt condensation of a diaryl carbonate and a dihydric phenol in the presence of a basic catalyst to produce an intermediate polycarbonate composition is finished by quenching with both an alkyl tosylate quencher and phosphorous acid. The efficiency of quenching can be measured by UV retention. Surprisingly, although phosphorous acid alone has no impact on the UV retention, the combination of alkyl tosylate quenchers and phosphorous acid provides a significant improvement over the use of the alkyl tosylate quencher alone. Thus, the method of the invention permits a reduction in the amount of alkyl tosylate quencher used, and can achieve superior results which cannot be achieved even by increasing the alkyl tosylate levels.

14 Claims, 2 Drawing Sheets

METHOD FOR QUENCHING OF POLYCARBONATE AND COMPOSITIONS PREPARED THEREBY

CROSS REFERENCE TO RELATED PATENTS

None

STATEMENT REGARDING FEDERALLY SPONSORED RESEARCH

Not applicable.

BACKGROUND OF THE INVENTION

This application relates to the finishing of polycarbonate using a melt process, and in particular to a method for quenching residual catalyst used in the polycarbonate-forming reaction, and the products formed by this reaction.

Aromatic polycarbonates are useful in a great many applications because of their desirable physical properties, including strength and optical clarity. There are three processes known for the production of aromatic polycarbonates, which are illustrated in FIG. 1. The conventional interfacial process and the phosgene-based melt process start with the reaction of phosgene with carbon monoxide. The "no phosgene" melt process was developed to eliminate the use of highly toxic phosgene in the reaction process.

Both types of melt processes make use of a diarylcarbonate such as diphenylcarbonate (DPC) as an intermediate, which is polymerized with a dihydric phenol such as bisphenol A (BPA) in the presence of an alkaline catalyst to form a polycarbonate in accordance with the general reaction shown in FIG. 2. This polycarbonate may be extruded or otherwise processed, and may be combined with additives such as dyes and UV stabilizers. In many cases, however, the presence of residual catalyst has a detrimental effect on the quality of the product, leading to poor color, molecular weight or rheological properties. Residual catalyst may also interact with additives, detracting from their efficacy. Thus, it is desirable to reduce the levels of residual catalyst to minimize these interactions. Such reduction is referred to as "quenching."

Commonly assigned U.S. Pat. No. 5,606,007, which is incorporated herein by reference, discloses the use of acidic compounds to quench residual alkalinity. The acid compounds tested are shown to produce polycarbonates with improved heat and water resistance, and low yellowness indices. An important consequence of residual alkaline catalyst which is not directly addressed by this patent is the base-catalyzed coupling of UV absorbers to the polycarbonate backbone. Normally, amounts of liquid quencher of less than 4 ppm are utilized. Although this amount is small, it corresponds to approximately 4 times the theoretical amount of quencher which should be necessary to neutralize all of the catalyst used. Nevertheless, despite the excess of quencher, reaction between UV absorber and polycarbonate backbone still occurs, impairing the efficiency of UV protection. Furthermore, it does not appear that the addition of more quencher has any significant effect on the levels of reaction between the UV absorber and the polycarbonate once a threshold has been reached. Thus, there remains a need for a method for quenching residual alkaline catalyst which more effectively reduces the interaction of UV absorbers with polycarbonate.

It would be desirable to provide such a method.

It would further be desirable to provide finished polycarbonate compositions with high UV retention values and good color stability.

SUMMARY OF THE INVENTION

These and other objects of the invention are provided by a method for finishing polycarbonate produced by melt condensation of a diaryl carbonate and a dihydric phenol in the presence of a basic catalyst to produce an intermediate polycarbonate composition, comprising the steps of;

(a) combining the intermediate polycarbonate composition with an alkyl tosylate quencher and phosphorous acid; and (b) processing the combination of the intermediate polycarbonate composition and the quenchers composition to blend the combination and quench residual basic catalyst present in the intermediate polycarbonate composition. The efficiency of quenching can be measured by UV retention. Surprisingly, although phosphorous acid alone has no impact on the UV retention, the combination of alkyl tosylate quenchers and phosphorous acid provides a significant improvement over the use of the alkyl tosylate quencher alone. Thus, the method of the invention permits a reduction in the amount of alkyl tosylate quencher used, and can achieve superior results which cannot be achieved even by increasing the alkyl tosylate levels.

DETAILED DESCRIPTION OF THE INVENTION

Figure 1A:
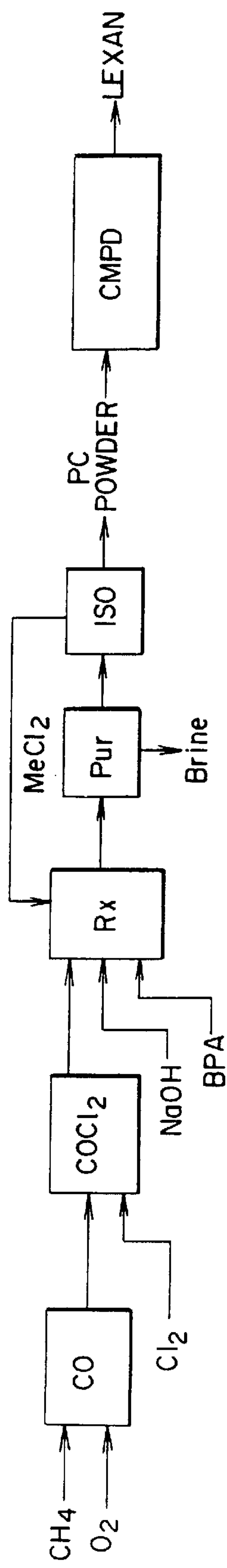
FIG. 1 shows three methods for manufacturing polycarbonates.
Figure 1B:
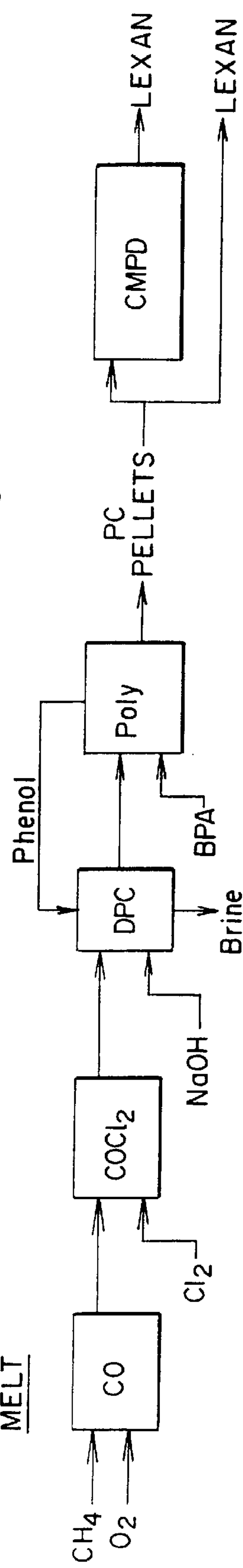
Figure 1C:
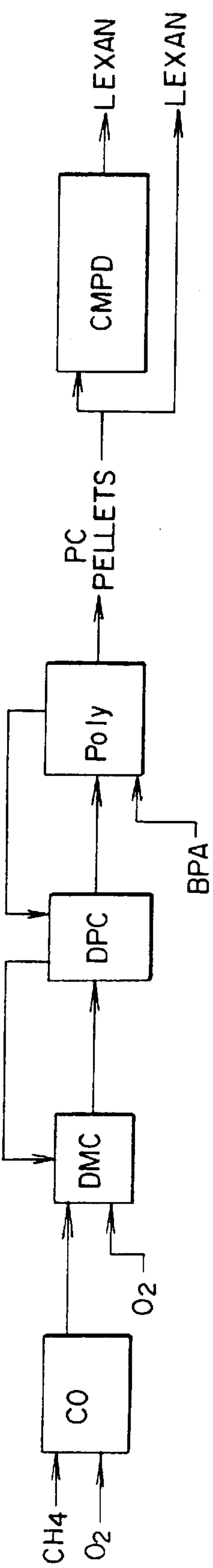
Figure 2:
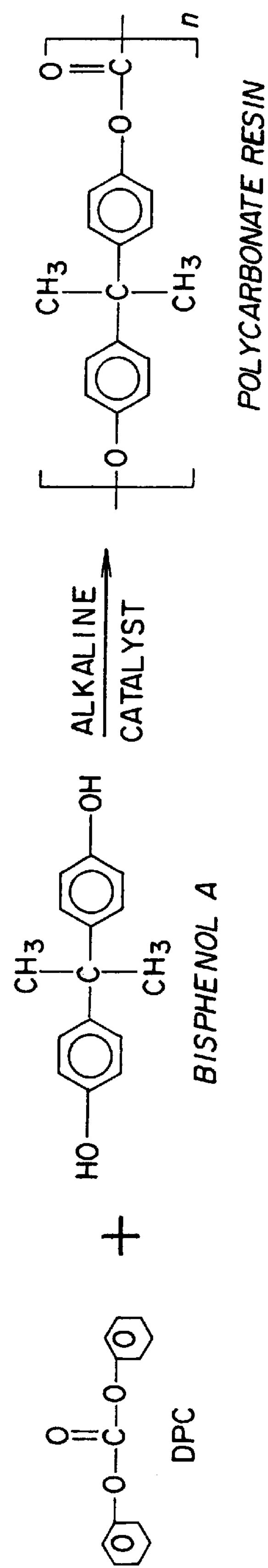
FIG. 2 shows the reaction of a diarylcarbonate and a dihydric phenol to produce a polycarbonate.

In the method of the present invention, residual alkaline catalyst present in a polycarbonate composition formed from the reaction of a diaryl carbonate and a dihydric phenol is quenched using an alkyl tosylate and phosphorous acid to provide a polycarbonate composition with improved properties. The method of the invention can be employed as a finishing step in the preparation of polycarbonates where an intermediate polycarbonate composition is formed from the reaction of a diaryl carbonate and a dihydric phenol in the presence of a basic catalyst in a melt. Preparation of polycarbonate compositions using this basic technique are known in the art, for example from U.S Pat. Nos. 5,717,057, 5,606,007 and 5,319,066 which are incorporated herein by reference.

While a preferred diaryl carbonate for use in the method of the invention is diphenylcarbonate, other diaryl carbonates may be used to make specialty polyearbonates. Various methods for synthesis of diaryl carbonates are known, for example from U.S. Pat. Nos. 5,210,268, 5,834,615 and 5,713,453 which are incorporated herein by reference.

A preferred dihydric alcohol for use in the method of the present invention is bisphenol A. Other dihydric alcohols, including those listed in U.S. Pat. No. 5,717,057 may also be used.

Catalysts used in the method of the present invention to form the intermediate composition are basic catalysts such as alkali metal or alkaline earth metal compounds or nitrogen-containing basic compounds which are effective to catalyze the production of polycarbonates by melt condensation of the diaryl carbonate and the dihydric phenol. Any of the known catalysts useful for this purpose may be employed.

The method of the invention provides a finishing step to reduce or eliminate residual catalyst in the polycarbonate product in order to minimize detrimental effects on the properties of the finished product. In accordance with the invention, this finishing step is accomplished by combining the intermediate polycarbonate composition with an alkyl tosylate and phosphorous acid; and processing the combination of the intermediate polycarbonate composition and the alkyl tosylate and phosphorous acid to blend the compositions and quench residual basic catalyst present in the intermediate polycarbonate composition.

The alkyl tosylate and the phosphorous acid may be introduced directly into the polycarbonate product of a base-catalyzed polycondensation. Alternatively, the intermediate polycarbonate product may be pelletized, and then remelted, for example in an extruder, for compounding with the quenchers. The amount of alkyl tosylate added will depend on the amount of alkaline catalyst used in the original reaction. For common commercial levels of catalyst, a suitable level of n-butyl tosylate quencher is between 1 and 7 ppm.

The alkyl tosylate quencher may be combined with the polycarbonate condensation product in any of several ways. In a first embodiment, the alkyl tosylate is combined with a polycarbonate powder, optionally containing additional finishing additives, and introduced through a side feed of the extruder. In a second embodiment, the alkyl tosylate is combined with a liquid carrier, for example propylene carbonate, and injected into the molten polycarbonate within the extruder. In a third embodiment, the alkyl tosylate is combined with polycarbonate in pellets and introduced through a side feed of the extruder. The pellets may be formed by pre-compounding the alkyl tosylate with polycarbonate; by compacting a mixture of polycarbonate powder and alkyl tosylate; or by coating alkyl tosylate as a layer on the exterior of polycarbonate pellets. Introduction of alkyl tosylate quenchers using each of these approaches is described in U.S. Pat. application Ser. No. 09/273,379, which is incorporated herein by reference.

The introduction of phosphorous acid can be accomplished as part of a powder masterbatch, optionally including other additives. This masterbatch is introduced via a side feed of the extruder. The phosphorous acid can also be introduced by liquid injection in water solution via a nozzle mounted in the extruder. The amount of phosphorous acid added will depend on the amount of alkaline catalyst used in the original reaction. For common commercial levels of catalyst, a suitable level of phosphorous acid quencher is between 1 and 6 ppm.

As described in the examples below, test runs were made comparing polycarbonate finished with quenching compositions in accordance with the invention to polycarbonate finished without quencher or using an alkyl tosylate quencher or phosphorous acid quencher alone. To analytical tests were used to evaluate the efficiency of quenching.

In the first test, the reactivity between polycarbonate and a UV absorber (Cyasorb 5411™, supplied by Cytec) was measured. Since this UV absorber has a reactive OH group, it can react in the presence of residual catalyst with the polycarbonate backbone. The amount of this reaction which occurs can be determined by measuring the UV absorbance due to the UV absorber, and is directly proportional to the amount of residual catalyst. Quantitatively, the amount of reaction can be $$\%UVRetention = \frac{Amountdetectedaftersolventextraction}{Amountdetectedafterfullhydrolysis} \times 100$$

expressed as

The higher the UV retention is, the better. Surprisingly, despite the fact that phosphorous acid alone was ineffective to improve UV retention, the UV retention observed for the combination of the n-butyl tosylate and phosphorous acid was higher than that obtained for n-butyl tosylate, even at higher levels.

The second test performed is a color stability test. In this test, the yellowness indices of two chips of polycarbonate molded at 360° C., one for a standard cycle time and one for a prolonged cycle time of 15 minutes are compared. The greater the difference between the yellowness index of the two chips, the less color stability the composition exhibits. Thus, it is desirable to have a low value for the color stability rating. The best results were obtained using the combination of n-butyl tosylate and phosphorous acid.

The invention will now be further described with reference to the following, non-limiting examples.

EXAMPLE 1

Experiments to evaluate the efficiency of quenchers and quencher combinations in accordance with the invention were performed on a large scale JSW co-rotative twinscrew extruder 160 mm, at 300° C., with a screw speed of 200 rpm and a throughput of 5300 kg/hr. An intermediate polycarbonate composition was finished by introduction of various additives. For all samples, water at a level of 100 ppm and pentaerythritol tetrastearate (PETS) were injected into the extruder via nozzles and a polycarbonate powder masterbatch containing 0.1 wt % heat stabilizer and 0.3 wt % UV absorber (Cyasorb 5411) was added via a side feeder. Phosphorous acid, when used, was also introduced with this masterbatch. Samples finished with n-butyl tosylate were treated by injecting a solution containing 4% n-butyl tosylate in propylene carbonate at a rate of 0.5 to 1.0 kg/hr.

A total of six experiments were conducted as summarized in Table 1. The resulting products were evaluated for % UV retention and color stability, as reflected in the increase in yellowness index (YI) following 15 minutes at 360° C. As shown in Table 1, sample 6 which was treated with both n-butyl tosylate and phosphorous acid exhibited surprisingly superior results.

TABLE 1

| Sample | ppm butyl tosylate | ppm $H_3PO_3$ | % UV Retention | Dwell YI Increase 360 C., 15 min |
|---|---|---|---|---|
| 1 | — | — | 45 | 4.8 |
| 2 | 2.4 | 0 | 65 | 4.2 |
| 3 | 3.6 | 0 | 80 | 3.8 |
| 4 | 4.8 | 0 | 78 | 3.7 |
| 5 | 0 | 6 | 43 | 5.5 |
| 6 | 3.6 | 2 | 93 | 3 |

EXAMPLE 2

Solid polycarbonate pellets containing alkyl tosylate quencher which can be used in the method of the present invention can be prepared in the three ways.

Precompounded quencher masterbatch pellets were prepared by dry blending of mixture of 100 parts polycarbonate powder and 0.3 parts n-butyl tosylate in a Henschel blender for a few minutes. The dry blended mixture was then compounded in a Leitritz co-rotative twin screw extruder 34 mm at 270° C., 250 rpm and 15 kg/hr. No vacuum was applied during the compounding to avoid volatilization of the quencher. After compounding, dry, transparent and natural pellets were obtained, and no processing issues were experienced. Analysis of the pellets by HPLC determined that they contained 1950 ppm n-butyl tosylate and 400 ppm of p-toluene sulfonic acid (also active as a quencher) which was formed from hydrolysis and thermal decomposition of the n-butyl ester.

Compacted pellets were prepared by dry blending a mixture of 98 parts polycarbonate powder, 2 parts pentaerythritol tetrastearate (PETS) and 0.3 parts of n-butyl tosylate. The dry blended mixture was compacted in a UMT compactor having a die diameter of 3 mm and a length of 12 mm at 15 kg/hr. The knife was adjusted to obtain regular white cylinders with an average length of 12 mm. PETS is used as a lubricant to minimize heat generation by friction. Formulations containing 1.5 parts PETS were difficult to compact but acceptable. Formulations containing less than 1 part PETS could not be compacted in this apparatus. Analysis of n-butyl tosylate in the compacted pellets was done by HPLC, and indicated levels of 2990 ppm with excellent consistency (Std. Deviation=46).

Coated pellets were prepared in a 150 liter Nauta-Hosokawa conic blender. 90 kg of polycarbonate pellets were introduced into the blender at room temperature and pre-blended for 5 minutes at 300 rpm. While maintaining the blending, 270 gr of n-butyl tosylate (0.3 wt % of the total PC weight) were then air sprayed into the pellets over a period of 2 minutes, creating a mist in the space over the top of the pellets. Blending continued for 10 minutes, during which time the quencher was absorbed by the pellets and the mist disappeared. The resulting pellets were dry, slightly hazy, and have the characteristic odor of the butyl tosylate. HPLC analysis indicated an average amount of quencher as 2500 ppm, suggesting some quencher accumulation on the wall of the blender.

What is claimed is:

1. A method for finishing polycarbonate produced by reaction in a melt of a diaryl carbonate and a dihydric phenol in the presence of a basic catalyst to produce an intermediate polycarbonate composition, comprising the steps of (a) combining the intermediate polycarbonate composition with an alkyl tosylate and phosphorous acid; and (b) processing the combination of the intermediate polycarbonate composition, the alkyl tosylate and the phosphorous acid to blend the combination and quench residual basic catalyst present in the intermediate polycarbonate composition.

2. The method of claim 1, wherein the alkyl tosylate is n-butyl tosylate.

3. The method of claim 2, wherein the amount of n-butyl tosylate is from about 2 to about 5 ppm.

4. The method of claim 3, wherein the amount of phosphorous acid is from about 1 to about 6 ppm.

5. The method of claim of claim 1, wherein the alkyl tosylate is combined with the intermediate polycarbonate composition in a liquid carrier.

6. The method of claim 3, wherein the alkyl tosylate is n-butyl tosylate.

7. The method of claim 4, wherein the liquid carrier is propylene carbonate.

8. The method of claim 6, wherein the amount of n-butyl tosylate is from about 2 to about 5 ppm.

9. The method of claim 8, wherein the amount of phosphorous acid is from about 1 to about 6 ppm.

10. An aromatic polycarbonate composition comprising (a) an aromatic polycarbonate obtained by reacting a diaryl carbonate and a dihydric phenol in the presence of a basic catalyst in a melt;

(b) an alkyl tosylate; and (c) phosphorous acid.

11. The composition of claim 10, wherein the alkyl tosylate is n-butyl tosylate.

12. The composition according to claim 11, wherein the n-butyl tosylate is present in an amount of from about 2 to 5 ppm.

13. The composition according to claim 12, wherein the phosphorous acid is present in an amount of from about 1 to 6 ppm.

14. The composition according to claim 11, wherein the phosphorous acid is present in an amount of from about 1 to 6 ppm.

* * * * *